Aug. 27, 1963 — A G. THOMAS — 3,101,546
ROTARY BONE FILE
Filed Sept. 21, 1961 — 2 Sheets-Sheet 1
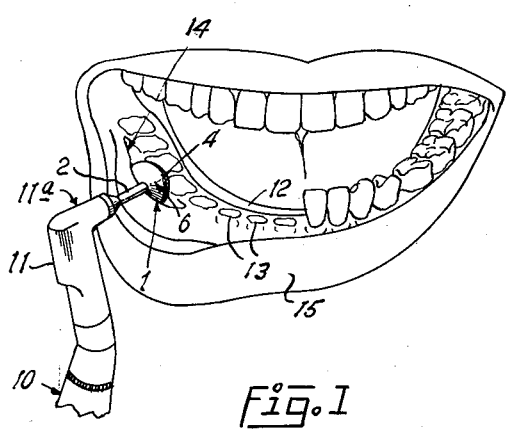
Fig. I
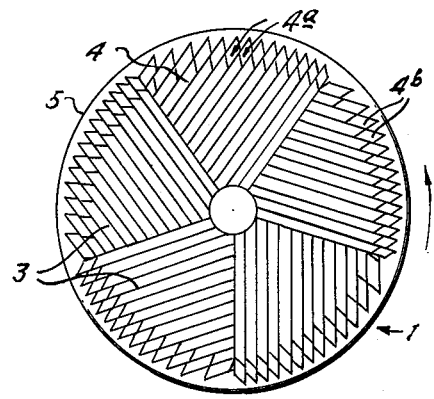
Fig. III
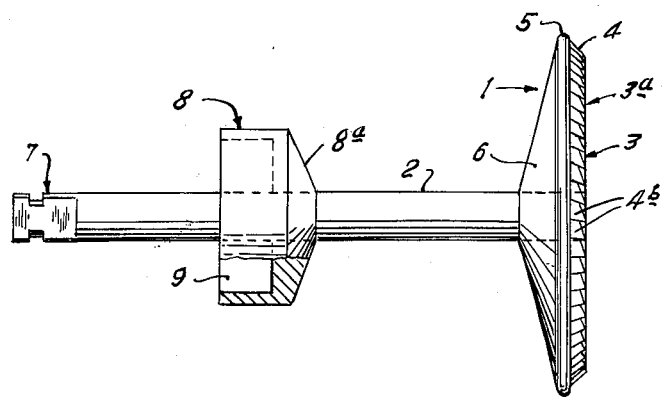
Fig. II
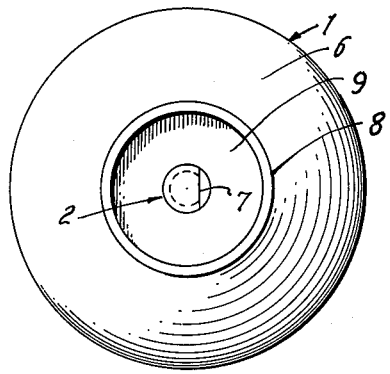
Fig. IV
INVENTOR
A G. Thomas
BY Howard E. Moore
ATTORNEY

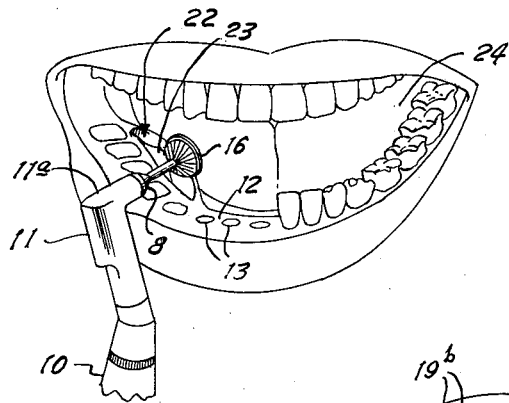
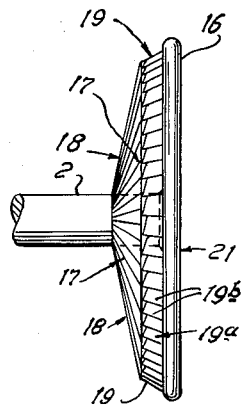
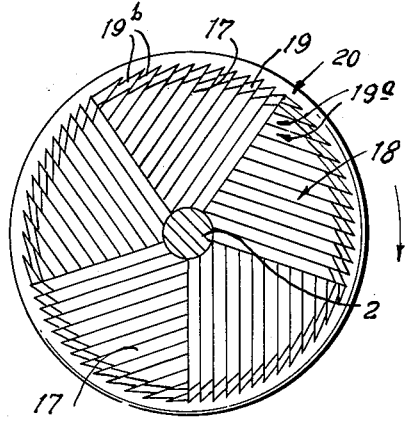
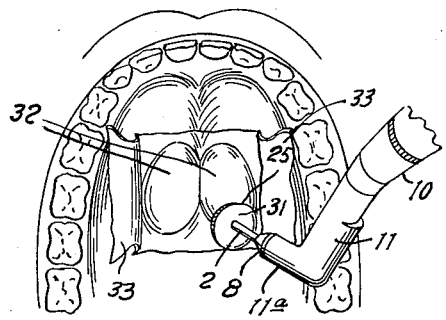
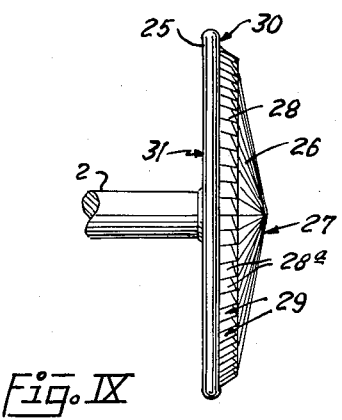

3,101,546
ROTARY BONE FILE
A G. Thomas, Longview, Tex., assignor of one-half to
Tommy Thomas, Longview, Tex.
Filed Sept. 21, 1961, Ser. No. 139,669
7 Claims. (Cl. 32—48)

This invention has to do with a rotary bone file primarily for use in dental and oral surgery, which is designed to be attached to the dentist's hand piece and rotated by the customary flexible shaft extending from power means mounted on the dentist's operating stand.

In fitting dental plates after extraction of teeth, it is often necessary for the dentist to remove bone spurs and protuberances, known as tori, from underneath the gums and in the roof of the mouth, in order to make the dental plate properly fit.

This procedure has been carried out in the past by means of rongeurs (pliers-like cutters), chisels, automatic mallets, bone burs, and hand files, which is not only painful to the patient, and unduly time consuming and tiresome for the dental surgeon, but causes undue damage, excess trauma, and edema to the soft tissues and the bone in the area of the operation, and results in undue swelling and post-operative pain to the patient.

The present invention is intended to provide a rotary bone file quickly and easily attachable to the dentist's hand piece to cut away spurs and protuberances of bone under the gums and in the palate of the mouth in such a manner as to minimize or entirely eliminate damage to bone structure and tissues adjacent the area of the spur or protuberance being removed, which protects the tongue and the inner side of the mouth from damage by such operation, the work and time required for carrying out such operation has been reduced by approximately two-thirds, post-operative pain and edema has been reduced to a minimum, swelling has been reduced, dental plates may be more quickly fitted and worn by the patient, and better results have been generally attained.

Other and further objects of the invention will become apparent upon reading the detailed specification hereinafter followship, and by referring to the drawings annexed hereto.

Suitable embodiments of the invention are shown in the attached drawings, wherein:

FIGURE I is a perspective view of the mouth of a patient, showing the gum of the patient after teeth have been extracted during the process of the alveolectomy, and an incision has been made on the crest of the ridge and the tissue and periosteum retracted, and one form of the rotary bone file has been inserted into said incision for cutting away bone spurs underneath the gum;

FIGURE II is a side elevational view of one form of the rotary bone file, which is partially cut away to show the cavity of the blood guard;

FIGURE III is an end elevational view of the outer face of the cutting disc, showing the blades thereon;

FIGURE IV is an end elevational view taken the from the left end of FIGURE II, showing the smooth inner surface of the cutting disc, and the inner surface of the blood guard;

FIGURE V is a perspective view of the mouth of a patient wherein teeth have been extracted from a portion of the lower gum, an incision has been made on the crest of the ridge and the tissue and periosteum retracted, and showing a modified form of the bone file attached to the dentist's hand piece, inserted into said incision, in position to cut away a lingual torous or protuberance on the bone underneath the gum;

FIGURE VI is a cross-sectional, elevational view of the modified bone file, showing the inner cutting face of the cutting disc;

FIGURE VII is a side elevational view of the cutting disc of such modified form;

FIGURE VIII is a view of the palate of a patient showing a still further modified form of rotary bone file attached to a dentist's hand piece, in position to remove a torous palatinus protuberance from the palate of the patient; and FIGURE IX is a side elevational view of the cutting disc of the modified form of rotary bone file shown in FIGURE VIII.

Numeral references are employed to designate the various parts shown in the drawings, and like numerals indicate like parts throughout the various figures of the drawings.

Referring first to the form of the rotary bone file shown in FIGURES I–IV, a disc-like head 1 is secured to a mandrel or rotatable shaft 2. The safe edge and safe back of cutting disc 1 has mounted on its outer face a plurality of blades 3, which as shown in FIGURE III are arranged in sections, the blades 3 in each section being parallel, and angularly disposed outwardly to provide a radial rake of suitable angularity to perform uniform cutting action as the head 1 is rotated in the direction indicated by arrow in FIGURE III.

The faces of the blades 3 present a flat plane surface 3a, and are angularly beveled at the outer periphery thereof as indicated at 4. The blades 3 are undercut and have sharp cutting edges on the flat surface 3a, but the ends thereof are blunted and flatted on the beveled peripheral area 4, as indicated at 4b. Therefore, it will be seen that the blades 3 on the face area 3a will cut away a surface against which it may be positioned, but the ends of the blades on the beveled area 4 will not cut a surface whch they might be rotated against because of the angularity of the ends of the blades causing them to be blunted so as to pass over the surface without cutting or tearing it.

Spaces 4a are provided between the parallel blades 3, which are continuous from the inner to the outer edge thereof so that cuttings, blood, saliva, and other waste material may be thrown out from between the blades 3 by centrifugal force as the disc 1 rotates, whereby the blades are, in effect, self-cleaning.

The blades 3 terminate short of the edge of disc 1, providing an outwardly extending peripheral safety edge 5 about the disc 1 adjacent the tapered peripheral surface 4 of the blade face for the purposes hereinafter described.

The side of the disc 1 opposite the blades 3 is smooth and preferably convexed, as indicated at 6, for the purposes hereinafter mentioned.

The mandrel 2 has an engaging end 7 thereon, which is arranged to be snapped into place, and releasably interlocked in the head of the dentist's hand piece hereinafter described.

A cup-like guard 8 is affixed to the mandrel 2, said guard 8 having a recess 9 provided on one side thereof and a smooth convexed surface 8a provided on the opposite side thereof.

To use the tool hereinbefore described, the engaging end 7 of the mandrel 2 is pushed into the offset portion 11a of head 11 of hand piece 10, and is thus disengagably affixed therein for rotation through the hand piece 10 in the usual manner.

It will be noted that the cavity 9 of the guard 8 extends over the outer end of the offset portion 11a, to protect the operating parts of the hand piece from blood, saliva, and cuttings which may move along the mandrel 2 between the disc 1 and the guard 8. The smooth rounded surface 8a on the inner face of the guard 8 comes into contact with the lip 15 of the patient, but smoothly rotates thereagainst without friction, and causes no damage.

After the teeth are extracted from the sockets 13 of the gum 12 of the patient, an incision 14 is made along the crest of the gum, to expose labial bony spurs and irregularities for removal. The incision is made sufficiently long and deep to allow the edge of the disc 1 to be inserted therein, as shown in FIGURE I, with the blade surface 3a in contact with the spurs or irregularities to be removed. The safe edge 5 and the angled edge 4 push back any tissue which would otherwise come into contact with the blade surface 3a, and protect it from being cut or abraded. The safe edge 5 is smooth, and the ends of the blades 3 in the area of the beveled peripheral surface 4 are flat so that the edge 5 and peripheral end 4 slide over tissue or bone as the disc 1 is rotated, and do not cut, abrade or bruise same. Therefore, only the spurs or protuberances desired to be cut come into contact with the cutting surface 3a and are quickly cut away and smoothed without damaging the surrounding area of the bone or cutting or bruising tissue in the vicinity thereof. It is virtually impossible to hang, snag, mutilate or damage the gum in any way, because the smooth inner side 6 of the disc 1 is rotated against the gum, and slides thereover, and does not damage same in any manner. In the event that the inner side of the jaw or lip should come into contact with the surface 6, it would not be abraded or damaged.

As the disc 1 rotates, cuttings, saliva and blood will be flung out from the open outer ends of the spaces 4a between the blades along the free angled surface 4 by centrifugal force, and may be carried away by an aspirator inserted into the mouth. Therefore, the blades are self-cleaning.

A modified form of the rotary bone file is shown in FIGURES V–VII, wherein a disc 16 is provided which is secured to the mandrel 2. The blades 17 are secured to the inner side of the disc 16, said blades radiating outwardly from the mandrel 2 in the same manner as the blades 3 hereinbefore described, and are formed to provide an angularly disposed cutting face 18 of generally convex contour, and an annular, beveled end surface 19 which is disposed at a more acute angle with reference to the axis of the mandrel 2 than the angular surface 18. The beveled surface 19 provides flat, blunted ends 19b on the blades 17.

The annular beveled surface 19 terminates short of the edge of the disc 16, to provide a safety edge 20, spacing the blades from the outer edge of the disc.

The blades 17 are spaced apart by spaces indicated at 19a, to provide the self-cleaning effect hereinbefore described with reference to the form of FIGURES I–IV, by virtue of the fact that cuttings, blood, and saliva, will be thrown outwardly from the spaces 19a by centrifugal force upon rotation of the disc 16.

It will also be observed that the blades 17 have cutting edges only on the surface 18, and that the outer edges of the blades along the surface 19 are flat and blunted, as indicated at 19b, so that they do not perform a cutting operation on the surface 19.

The disc 16 has a smooth, flat surface 21 on the outer side thereof, so as to slide over and not damage tissue with which it might come in contact.

The form of the bone file immediately hereinbefore described has particular application in removing lingual protuberances, such as indicated at 23 in FIGURE V, it being noted that the cutting surface 18 of blades 17 is disposed on the inner side of the disc 16 so that they are in position to contact the bone underneath the inner side of the gum 12 of the patient, when attached to the head 11 of the dentist's hand tool 10, as shown in FIGURE V.

The bony projections in the area adjacent the region of the lower third molar on the inner side of the gum have heretofore posed a serious problem to the dental surgeon, inasmuch as the lingual tissue in this area is very thin and may be torn easily with hand instruments now in use.

In the use of the modified form of the instrument hereinbefore described, an elongated incision 22 is made along the crest of the gum ridge 12, to expose the bone projection 23. The edge of the disc 16 is inserted in the incision 22, and the cutting surface 18 positioned against the bone protuberance 23. In such position it will be noted that the safety edge 20, and the smooth safety back 21 of the disc 16, press back and protect the tissue of the gum and of the tongue 24, and any tissue which might possibly be exposed around the safety edge 20 is protected from damage in that it would come into contact with the flat ends 19b of the blades 19.

Still another form of the rotary bone file is shown in FIGURES VIII and IX, wherein disc 25 is secured to the mandrel 2, said disc 25 having blades 26 mounted on the outer face thereof which are substantially the same contour and disposition as the blades 17 in the form shown in FIGURES V–VII. The blades 26 provide an angled, generally convex cutting face 27. The blades 26 are beveled about the peripheral edge, as indicated as 28, providing an angularly disposed peripheral edge surface which is angled at a more acute angle with respect to the axis of the mandrel 2 than the cutting surface 26. The ends of the blades about the angled surface 28 are flat and blunted as indicated at 28a so that they do not cut, and terminate short of the edge of the disc 25 in order to provide a safety edge 30 thereabout. The inner surface 31 of the disc 25 is smooth so as to provide a protective surface.

The above described form of the instrument is particularly advantageous in removing torous palatinus from the palate or roof of the mouth, as indicated at 32 in FIGURE VIII, access to which is obtained by peeling back the covering tissue, as indicated at 33.

This has always been a very dangerous and meticulous procedure for the dental surgeon, because the palatal bone is very thin, and tori are very thick and hard, so that in removing the tori such physical force with hammer, chisel, and file are required that in some instances the palatal bone has been fractured, resulting in a fistula through the roof of the mouth. With the use of the rotary bone file of the form shown in FIGURE IX, this operation may be performed and completed quickly and easily, by simply retracting the covering tissue and contacting the protuberances 32 with the cutting surface 27, and applying slight pressure to cut away the protuberance. The post-operative healing is quick, because by virtue of the safety edge 30 and the beveled surface 29, the surrounding tissue and bone in the area operated on is not damaged or bruised in any manner.

The use of the rotary bone file shown and described herein has virtually eliminated need for the rongeur, the chisel and the hand mallet in the alveolectomy and removal of palatal and mandibula tori, and has relegated hand files to a secondary role in dental surgery.

In the use of the rotary bone files, it is unnecessary to use coolants or lubricants, because the cutters are so designed as hereinbefore described, that they cannot become clogged and are self-cleaning so that the aspirator will readily remove bone cuttings and other undesirable particles from the area of operation. The files can be rotated at great speeds, to effect speedy operation without fear of damaging the soft tissue because of the slope of the ends of the cutter blades, and the safe edge and safe back of the disc. The post-operative healing will be smooth and even with a minmum of post-operative sedation for pain, because of the minimum damage to surrounding tissue. Of course, the rotary files would be made of stainless steel or other non-corrosive material, which can be easily cleaned and sterilized.

The rotary bone file will also fit in a straight headed hand piece as well as an angle headed hand piece, as shown, and could be employed for bone filing in other surgical procedure than dental surgery.

It will be understood that other and further forms of my invention may be made without departing from the spirit and scope of the appended claims.

Having described my invention, I claim:

1. A rotary bone file comprising, a mandrel; a disc-like head mounted on one end of the mandrel; a cutting surface on one face of the head comprised of a plurality of sections of blades, the blades in each section being parallel and equally spaced and extending angularly outwardly and terminated at their outer ends with a beveled non-cutting surface; a smooth surface on the other face of the disc, the said beveled surface being spaced from the edge of the head to provide a safety edge whereby the beveled edge and the safety edge are non-cutting so that only the cutting surface of the blades perform the cutting action when the disc is rotated.

2. The combination called for in claim 1 with the addition of a cup-like guard secured about the mandrel and spaced from the disc.

3. The combination called for in claim 1 wherein the blades present a substantially convex cutting face.

4. The combination called for in claim 1 wherein the blades are on the outer side of the disc.

5. The combination called for in claim 1 wherein the blades are on the inner side of the disc.

6. The combination called for in claim 1 wherein the smooth surface is substantially convex.

7. The combination called for in claim 1 wherein the smooth surface is flat.

References Cited in the file of this patent

UNITED STATES PATENTS

| | | |
|---|---|---|
| 471,887 | Park | Mar. 29, 1892 |
| 689,596 | Platt | Dec. 24, 1901 |
| 771,311 | Kille | Oct. 4, 1904 |
| 1,827,511 | Evans | Oct. 13, 1931 |
| 2,618,855 | Bergendal | Nov. 25, 1952 |
| 2,735,181 | Carpenter | Feb. 21, 1956 |
| 2,863,209 | Klopfer | Dec. 9, 1958 |